(12) United States Patent
Iizuka

(10) Patent No.: US 6,469,831 B2  
(45) Date of Patent: Oct. 22, 2002

(54) MULTIBEAM OPTICAL SYSTEM

(75) Inventor: Takashi Iizuka, Saitama-ken (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/753,566

(22) Filed: Jan. 4, 2001

(65) Prior Publication Data

US 2001/0009476 A1 Jul. 26, 2001

(30) Foreign Application Priority Data

Jan. 7, 2000 (JP) .................................... 2000-001192

(51) Int. Cl.[7] ................................................ G02B 5/18
(52) U.S. Cl. ...................... 359/565; 359/569; 359/565
(58) Field of Search ............................ 359/558, 565, 359/566, 569, 204

(56) References Cited

U.S. PATENT DOCUMENTS

| | | | | |
|---|---|---|---|---|
| 4,150,880 A | * | 4/1979 | Howe et al. | 359/309 |
| 4,435,041 A | | 3/1984 | Torok et al. | 359/573 |
| 4,459,690 A | * | 7/1984 | Corsover et al. | 369/44.13 |
| 4,556,290 A | * | 12/1985 | Roulot | 359/309 |
| 5,291,329 A | * | 3/1994 | Wakimoto et al. | 359/362 |
| 5,574,597 A | * | 11/1996 | Kataoka | 359/569 |
| 5,631,762 A | * | 5/1997 | Kataoka et al. | 347/233 |
| 5,754,295 A | * | 5/1998 | Mitchell | 250/237 G |
| 5,783,798 A | * | 7/1998 | Abraham | 219/121.73 |
| 5,798,784 A | | 8/1998 | Nonaka et al. | 359/204 |
| 6,021,000 A | | 2/2000 | Iizuka et al. | 359/569 |
| 6,178,028 B1 | * | 1/2001 | Washiyama et al. | 259/204 |

FOREIGN PATENT DOCUMENTS

JP          10-78504          3/1998

* cited by examiner

Primary Examiner—Cassandra Spyrou  
Assistant Examiner—John Juba, Jr.  
(74) Attorney, Agent, or Firm—Greenblum & Bernstein, P.L.C.

(57) ABSTRACT

A multibeam optical system that employs a laser source emitting a laser beam, a diffractive beam-dividing element that diffracts the laser beam emitted from the laser source to be divided into a plurality of diffracted beams exiting at different diffraction angle, and a compensating optical system. compensating optical system, which is afocal and consists of a first group and a second group, arranged at the position where beams divided by a diffractive beam-dividing element are incident thereon. The compensating optical system has a characteristic such that the angular magnification thereof is inversely proportional to the wavelength of the incident beam. The angular difference among the diffracted beam caused by the wavelength dependence of the diffractive beam-dividing element can be reduced when the beams transmit the compensating optical system.

8 Claims, 3 Drawing Sheets

MULTIBEAM OPTICAL SYSTEM

BACKGROUND OF THE INVENTION

The present invention relates to a multibeam optical system that divides a laser beam emitted from a laser source into a plurality of beams and forms a plurality of beam spots on an object surface. Particularly, the invention relates to the optical system that employs a diffractive beam-dividing element to divide a laser beam emitted from a laser source.

The multibeam optical system needs a beam-dividing element that divides a laser beam emitted from a laser source into a plurality of beams to form a plurality of beam spots on the object surface.

A conventional multibeam optical system has employed a prism-type beam splitter as the beam-dividing element, which comprises a plurality of prism blocks cemented to one another. The cemented faces of the prism blocks are provided with multi-layer coatings having the desired reflecting properties, respectively.

However, when employing a prism-type beam splitter, since each one of the multi-layer coatings can divide an incident beam only into two separate beams, the number of prism blocks corresponding to the required number of separate beams must be cemented to one another. Further, when cementing one block to another block, an angle error between two cemented face unavoidably arises. Accordingly, when a large number of separate beams are required, the deviations of the beam spots on the object surface tend to become large due to an accumulation of positional errors between the cemented prism blocks.

Recently, a diffractive beam-dividing element has become used in place of a prism-type beam splitter. Since the diffractive beam-dividing element is made of a single block that is not cemented, it does not generate any positional error even when the large number of the separate beams are required.

With employing the diffractive beam-dividing element, however, since the diffraction angle of a light beam varies depending upon the wavelength thereof, the same order diffracted beam may be separated to form a plurality of beam spots in different positions on the object surface, in case a light source emits a light beam having a plurality of peak wavelengths.

For example, an argon laser, which is used as a light source of a laser photo plotter or the like, has a plurality of peak wavelengths in the ultraviolet and visible regions. Therefore, in order to avoid the above defects, it has been required to use a filter for passing a beam component of a selected peak wavelength. Thus, the beam components of peak wavelengths other than the selected peak wavelength are cut off by the filter, which results in low energy efficiency.

Further, even if a beam emitted from a light source has a single peak wavelength, in case a peak wavelength of a beam actually emitted from a light source fluctuates or varies, a beam spot pitch on a surface to be exposed is changed.

SUMMARY OF THE INVENTION

It is therefore an object of the present invention to provide an improved multibeam optical system capable of avoiding the defect such as a separation of the same order diffracted beam or a variation of the beam spot pitch caused by the wavelength dependence of a diffractive beam-dividing element employed therein.

For the above object, according to the present invention, there is provided an improved multibeam optical system that includes a compensating optical system, which is afocal and consists of a first group and a second group, arranged at the position where beams divided by a diffractive beam-dividing element are incident thereon. The compensating optical system has a characteristic such that the angular magnification thereof is inversely proportional to the wavelength of the incident beam.

With this construction, the same order diffracted beams of the respective wavelengths diffracted by the diffractive beam-dividing element exit at the different diffraction angles, and the diffracted beams are incident on the first group of the compensating optical system. Since a diffraction angle of the diffractive beam-dividing element increases as a wavelength becomes longer, an incident angle on the compensating optical system increases as a wavelength becomes longer. On the other hand, when the angular magnification of the compensating optical system is inversely proportional to the wavelength, the ratio of an incident angle on the compensating optical system to an exit angle therefrom decreases as a wavelength becomes longer. Therefore, the angular difference among the diffracted beam caused by the wavelength dependence of the diffractive beam-dividing element can be reduced when the beams transmit the compensating optical system.

In another aspect of the invention, the following conditions (1) and (2) are satisfied to counterbalance the angular difference of the diffracted beams with the variation of the angular magnification of the compensating optical system:

$$v_1 = \frac{f_1 + f_2}{f_1} \cdot v_{DOE} \tag{1}$$

$$v_2 = -\frac{f_1 + f_2}{f_2} \cdot v_{DOE} \tag{2}$$

where $v_1$ is the Abbe number of the first group, $f_1$ is the focal length of the first group, $v_2$ is the Abbe number of the second group, $f_2$ is the focal length of the second group, and $v_{DOE}$ is a dispersive power of the diffractive beam-dividing element, which corresponds to an Abbe number of a refractive lens.

Further, it is preferable that the compensating optical system substantially satisfies the following conditions (3), (4) and (5):

$$\frac{f_1}{v_1} = -\frac{f_2}{v_2} \tag{3}$$

$$f_1 = f_2 \tag{4}$$

$$v_1 = -v_2 = 2v_{DOE}. \tag{5}$$

Each of the first group and the second group may be an element having reflecting surfaces of a positive power on which a diffractive lens structure is formed. In such a case, the conditions (1), (2) and (5) can be satisfied without difficulty. Alternatively, each of the first and second groups may be a composite element of a positive refractive lens and a diffractive lens structure.

The first group is preferably located at a position where the distance from the diffractive beam-dividing element is equal to the focal length $f_1$ of the first group.

The multibeam optical system of the present invention is usually applied to a multibeam scanning optical system, however it can be applied to other systems as a matter of course.

DESCRIPTION OF THE EMBODIMENTS

Figure 1:
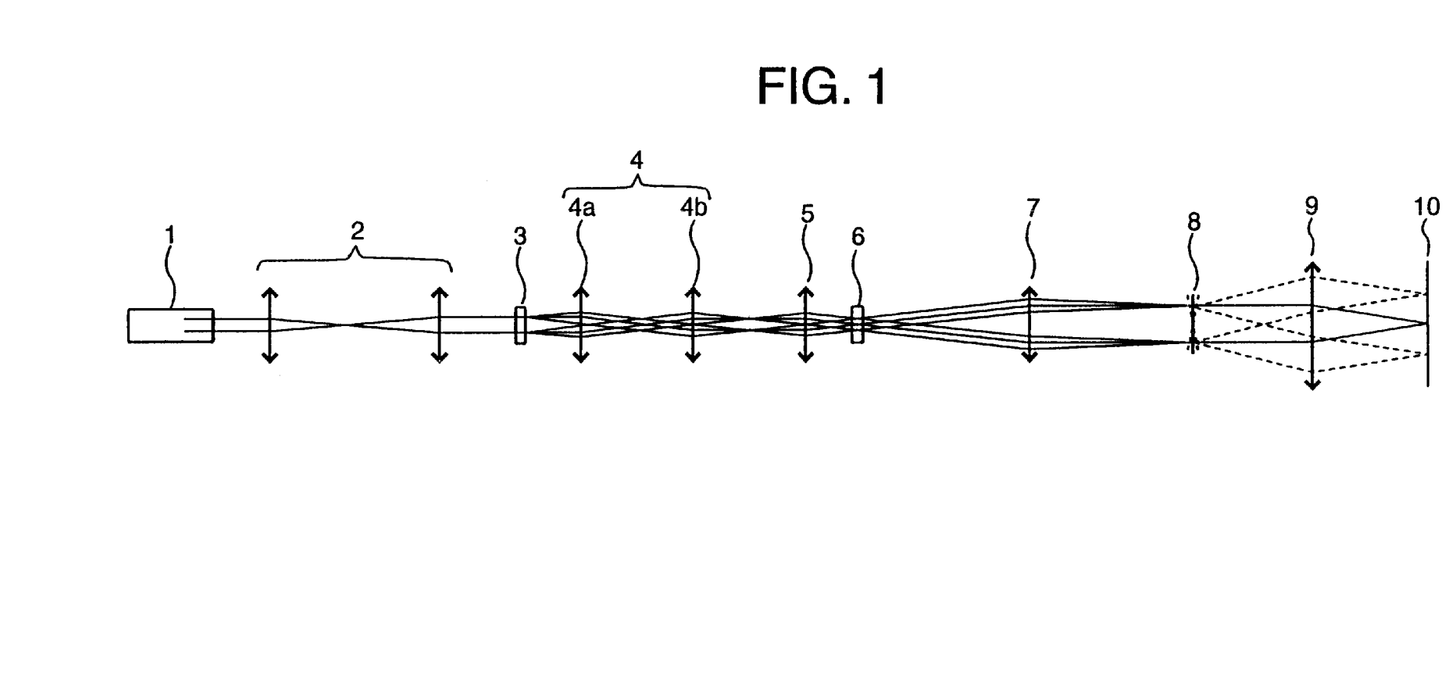
FIG. 1 shows a multibeam scanning optical system embodying the invention.
Figure 2:
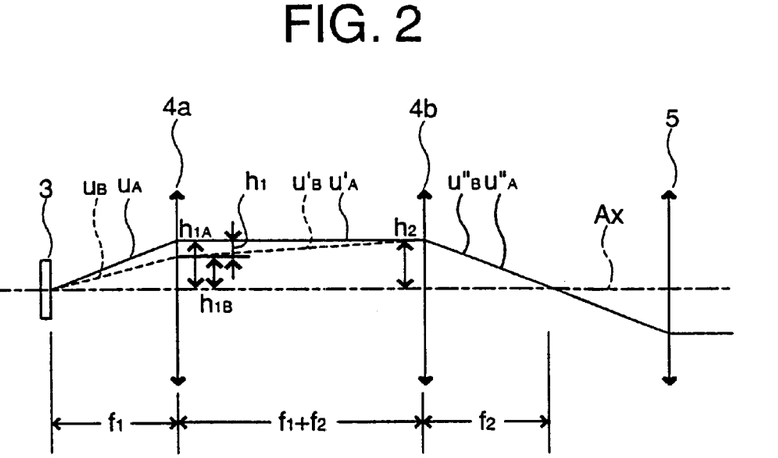
FIGS. 2 and 3 are partial enlarged views of a compensating optical system in FIG. 1 showing the principle of the invention.
Figure 3:
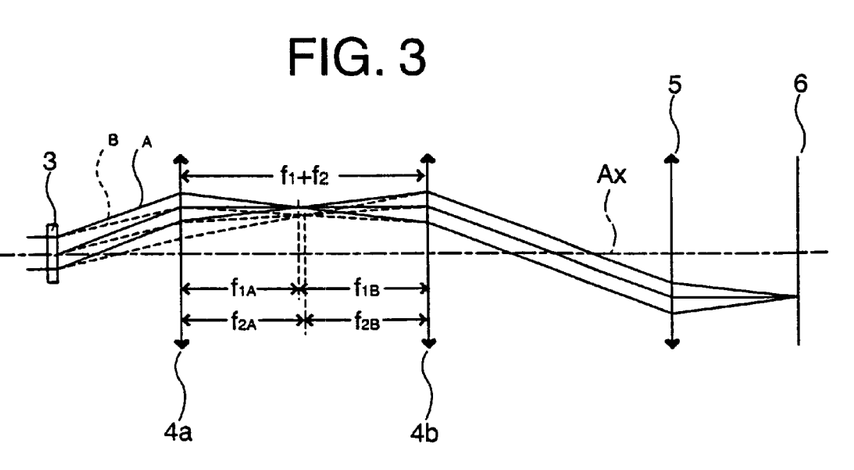

A multi-beam optical system embodying the present invention will be described hereinafter by referring to the accompanying drawings. FIG. 1 shows a multibeam scanning optical system embodying the invention; and FIGS. 2 and 3 show the principle of the invention. At first the construction of the embodiment will be described with reference to FIG. 1, and then the principle of the invention will be described with reference to FIGS. 2 and 3. In the drawings, curved mirrors, which are disposed in the optical system, are represented as if they are light transmittable elements like lenses in order to provide a clear understanding of an optical path. Therefore, the optical system is developed to make the optical axis straight in the drawings. Further, optical element such as a lens and a mirror are shown as thin lenses in the drawings.

As shown in FIG. 1, a multi-beam scanning optical system embodying the invention comprises a laser source 1, a beam expander 2, a diffractive beam-dividing element 3, a compensating optical system 4, a converging mirror 5, a multi-channel modulator 6, a collimator lens 7, a polygonal mirror 8 as a deflector, an fθ lens 9 as a scanning lens and an object surface 10 to be exposed, which are arranged in this order from left in FIG. 1.

Since the polygon mirror 8 rotate about the rotation axis that is perpendicular to the sheet of FIG. 1 to deflect the beams in a vertical direction (i.e., up-and-down direction) in FIG. 1, the vertical direction in FIG. 1 is referred to as a main scanning direction. Further, since the object surface 10 moves in a direction perpendicular to the sheet of FIG. 1 to form a two-dimensional image thereon, the direction perpendicular to the sheet of FIG. 1 is referred to as an auxiliary scanning direction.

The laser source 1 is a multiline laser source such as an argon laser having a plurality of peak wavelengths. The beam expander 2 adjusts the diameter of the laser beam emitted from the laser source 1. The diffractive beam-dividing element 3 diffracts the parallel beam from the beam expander 2 to divide it into a plurality of laser beams outputting at different angles. Further, since the diffractive beam-dividing element 3 diffracts the incident laser beams of the respective wavelengths at different angles, the same order diffracted beams of the respective wavelengths exit at the different diffraction angles from the diffractive beam-dividing element 3.

Figure 4:
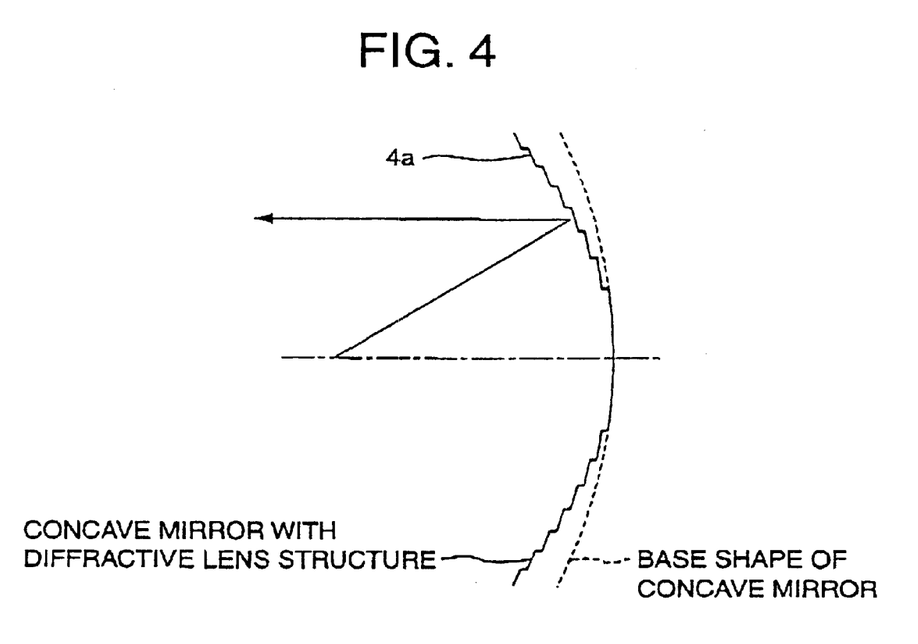
FIG. 4 shows an exemplary positive power reflector of the first group of the compensating optical system.

The parallel laser beams divided by the diffractive beam-dividing element 3 are, respectively, incident on the compensating optical system 4. The compensating optical system 4 consists of a first group 4a that has a negative chromatic dispersion and a second group 4b that has a positive chromatic dispersion. The first group 4a is composed of a concave mirror and a diffractive lens structure having a positive power formed on the concave mirror, as indicated in FIG. 4. Similarly, the second group 4b is composed of a concave mirror and a diffractive lens structure having a negative power formed on the concave mirror. Each of the first and second groups 4a and 4b has a positive power as a whole. The compensating optical system 4 in an afocal optical system and the angular magnification is inversely proportional to the wavelength of the incident beam to compensate an angular difference of the same order diffracted beams caused by the wavelength dependence of the diffractive beam-dividing element 3. The same order diffracted beams of the respective wavelengths are adjusted to travel along the same optical path after the beams passing through the compensating optical system 4. Abbe numbers and focal lengths of the first and second groups 4a and 4b of the compensating optical system 4 are determined to achieve the compensating function, as described below. The first group 4a is located such that the distance from the diffractive beam-dividing element 3 to the front principal point thereof is equal to the focal length $f_1$ of the first group 4a. The second group 4b is located such that the distance from the rear principal point of the first group 4a to the front principal point of the second group 4b is equal to the sum of the focal length $f_1$ of the first group 4a and the focal length $f_2$ of the second group 4b.

The parallel beams of the respective diffraction orders passing through the compensating optical system 4 are converged by the converging mirror 5. The convergent beams are aligned such that the chief rays are parallel to one another. The multi-channel modulator 6 such as an acousto-optic modulator (AOM) is located at beam waist position of the converged beams. The multi-channel modulator 6 is provided with a plurality of channels each of which changes a direction of the converged laser beam in response to the input ultrasonic wave. The detail construction of the multi-channel modulator is not illustrated because the multichannel modulator is a device that is in general use. In a channel, when the ultra sonic wave is applied to a medium, a diffraction grating is formed by a compression wave caused in the medium. The diffracted beam emerges as the modulated beam, and the non-diffracted beam is cut off by a shading plate. The channels of the multichannel modulator 6 are independently controlled to independently modulate the laser beams, i.e., to independently turn ON/OFF the laser beams, respectively.

The collimator lens 7 is arranged such that the front focal point thereof is coincident with the multichannel modulator 6 on a center axis of the beams, i.e., an optical axis of the system. The modulated beams are converged into parallel beams whose beam axes intersect at the rear focal point of the collimator lens 7.

The polygonal mirror 8 is arranged such that the reflecting surface is located at the rear focal point of the collimator lens 7. The polygonal mirror 8 rotates about the rotation axis to deflect the laser beams in the main scanning direction while keeping angular difference among the laser beams of the respective diffraction orders.

The deflected laser beams are converged by the fθ lens 9 to form a plurality of beam spots aligned in the auxiliary scanning direction at equal intervals on the object surface 10. The beam spots simultaneously scan in the main scanning direction at a constant speed as the polygonal mirror 8 rotates.

Details of the compensating optical system 4 will be explained by referring to FIGS. 2 and 3. In this embodiment, the respective one of the first and second groups 4a and 4b comprises a concave mirror on which a diffractive lens structure is formed.

The diffractive lens structure has an advantage in its suitability for compensating the angular difference caused by the wavelength dependence of the diffractive beam dividing element 3. The dispersive power $\nu_{DOE}$ of the diffractive lens structure, which corresponds to an Abbe number of a refractive lens, is −3.453. That is, the diffractive lens structure shows a relatively large dispersive power as compared with a refractive lens, which allows the compensating optical system 4 to correct the chromatic dispersion of the diffractive beam-dividing element even if it is too large to be corrected by a refractive lens.

Further, when the diffractive lens structure is formed on the reflecting surface as described above, the chromatic dispersion in the compensating optical system 4 occurs only by the diffractive lens structures thereof, the dispersion shows a linear relationship with the wavelength of the light beam, which is suitable to cancel the chromatic dispersion caused by the diffractive beam-dividing element 3 as it shows also a linear relationship with the wavelength of the light beam.

In FIGS. 2 and 3, the laser beam of the first wavelength $\lambda_A$ and the chief ray thereof are illustrated by solid lines, the laser beam of the second wavelength $\lambda_B$ and the chief ray thereof are illustrated by dotted lines. Assuming that the first wavelength $\lambda_A$ is longer than the second wavelength $\lambda_B$.

Since the diffractive beam-dividing element 3 has a negative chromatic dispersion, the diffraction angle of the beam of the first wavelength $\lambda_A$ is larger than that of the second wavelength $\lambda_B$, as shown in FIG. 3. Therefore, a height (a distance from the optical axis Ax) of an incident point and an incident angle on the first group 4a of the compensating optical system 4 increase as the wavelength becomes longer.

The first group 4a of the compensating optical system 4 functions to equate the intersection heights of the same order diffracted beams (particularly, the chief rays) having the respective wavelengths when the beams are incident on the second group 4b. Accordingly, the first group 4a must have a negative dispersion ($1/\nu_1 < 0$) to increase a deviation angle as a wavelength becomes longer. Next, the value $\nu_1$ will be found.

In FIG. 2, with respect to the chief ray of the first wavelength $\lambda_A$, $u_A$ is an angle of the chief ray to the optical axis Ax when the ray is incident on the first group 4a;

$h_{1A}$ is a height of an incident point when the ray is incident on the first group 4a;

$u'_A$ is an angle of the chief ray to the optical axis Ax when the ray exits the first group 4a;

$\phi_{1A}$ is a power of the first group 4a; and $f_{1A}$ is a focal length of the first group 4a.

In the same manner, with respect to the chief ray of the second wavelength $\lambda_B$, $u_B$ is an angle of the chief ray to the optical axis Ax when the ray is incident on the first group 4a;

$h_{1B}$ is a height of an incident point when the ray is incident on the first group 4a;

$u'_B$ is an angle of the chief ray to the optical axis Ax when the ray exits the first group 4a;

$\phi_{1B}$ is a power of the first group 4a; and $f_{1B}$ is a focal length of the first group 4a.

Assuming that the chief ray of the first wavelength $\lambda_A$ is parallel to the optical axis Ax after a reflection by the first group 4a and the chief rays of the first and second wavelengths $\lambda_A$ and $\lambda_B$ are incident at the same position on the second group 4b. In this case, the angle $u'_A$ of the chief ray of the first wavelength $\lambda_A$ is given by the equation (1):

$$u'_A = u_A + h_{1A}\phi_{1A} \qquad (1)$$

Since the chief ray of the first wavelength $\lambda_A$ is parallel to the optical axis Ax, $u'_A = 0$, and then the equation (1) is converted to $$u_A = -h_{1A}\phi_{1A} \qquad (2)$$

On the other hand, the angle $u'_B$ of the second wavelength $\lambda_B$ is given by the equation (3):

$$u'_B = u_B + h_{1B}\phi_{1B} = \frac{\lambda_B}{\lambda_A} \cdot u_A + \frac{\lambda_B}{\lambda_A} \cdot h_{1A} \cdot \phi_{1B} \qquad (3)$$

Substitution of the equation (2) into the equation (3) yields the equation (4).

$$\begin{aligned} u'_B &= -\frac{\lambda_B}{\lambda_A} \cdot h_{1A} \cdot \phi_{1A} + \frac{\lambda_B}{\lambda_A} \cdot h_{1A} \cdot \phi_{1B} \\ &= \frac{\lambda_B}{\lambda_A} \cdot h_{1A}(\phi_{1B} - \phi_{1A}) \\ &= \frac{\lambda_B}{\lambda_A} \cdot h_{1A}\left(\frac{1}{f_{1B}} - \frac{1}{f_{1A}}\right) \end{aligned} \qquad (4)$$

Further, $h_{1A} = -u_A \times f_{1A}$ as shown in FIG. 2, the equation (4) is converted to $$u'_B = -\frac{\lambda_B}{\lambda_A} \cdot u_A \cdot f_{1A} \cdot \frac{f_{1A} - f_{1B}}{f_{1A}f_{1B}}$$

Assuming that $f_{1A} - f_{1B} = -\Delta f_1$, and $f_{1B} = f_1$, $$u'_B = \frac{\lambda_B}{\lambda_A} \cdot u_A \cdot \frac{\Delta f_1}{f_1}$$

Since the value of $\Delta f$ represents a longitudinal chromatic aberration and it is equal to $-f/\nu$, the above equation is converted to $$u'_B = -\frac{\lambda_B}{\lambda_A} \cdot \frac{u_A}{\nu_1} \qquad (5)$$

Further, according to FIG. 2, a condition to compensate the difference $\Delta h_1$ between $h_{1A}$ and $h_{1B}$ is represented as follows:

$$\begin{aligned} \Delta h_1 &= (u_A - u_B) \cdot f_1 = u'_B \cdot (f_1 + f_2) \\ &= \left(u_A - \frac{\lambda_B}{\lambda_A} \cdot u_A\right) \cdot f_1 = u'_B \cdot (f_1 + f_2) \\ &= \frac{\lambda_A - \lambda_B}{\lambda_A} \cdot u_A \cdot f_1 = u'_B \cdot (f_1 + f_2) \end{aligned} \qquad (6)$$

On the basis of the equations (5) and (6), $$\begin{aligned} u'_B &= -\frac{\lambda_B}{\lambda_A} \cdot \frac{u_A}{\nu_1} \\ &= \frac{f_1}{f_1 + f_2} \cdot \frac{\lambda_A - \lambda_B}{\lambda_A} \cdot u_A \end{aligned}$$

It is converted to the equation (7) to solve about $\nu_1$ as follows:

$$v_1 = \frac{\lambda_B}{\lambda_B - \lambda_A} \cdot \frac{f_1 + f_2}{f_1} \tag{7}$$

The equation (7) can be converted to the equation (8) because $\lambda_B/(\lambda_B-\lambda_A)$ is equal to the equivalent Abbe number $v_{DOE}$ of a diffractive optical element.

$$v_1 = \frac{f_1 + f_2}{f_1} \cdot v_{DOE} \tag{8}$$

The equation (8) is a condition of the Abbe number $v_1$ required for the first group 4a to equate the heights of the diffracted beams of the wavelengths $\lambda_A$ and $\lambda_B$ when they are incident on the second group 4b. As described above, since the compensating optical system 4 is an afocal optical system as a whole, both of the focal lengths $f_1$ and $f_2$ take positive values. Accordingly, the Abbe number $v_1$ is required to be negative. A glass lens has a positive value in the Abbe number, it is impossible to satisfy the equation (8) when the first group 4a consists of glass lenses only. Therefore, the first group 4a is formed as a combination of a reflection mirror that has no chromatic dispersion and a diffractive lens structure whose equivalent abbe number is negative.

An incident angle on the second group 4b of a predetermined order diffracted beam (particularly, a chief ray) deflected by the first group 4a increases as a wavelength becomes shorter. The second group 4b has a function to direct the same order diffracted beams that are incident at the same position into the same direction. Accordingly, the second group 4b must have a positive dispersion ($1/v_2>0$), to increase a deviation angle as a wavelength becomes shorter. Next, the value $v_2$ will be found.

In FIG. 2, with respect to the chief ray of the first wavelength $v_A$, u"$_A$ is an angle of the chief ray to the optical axis Ax when the ray exits the second group 4b; and $\phi_{2A}$ is a power of the second group 4b.

In the same manner, with respect to the chief ray of the second wavelength $\lambda_B$, u"$_B$ is an angle of the chief ray to the optical axis Ax when the ray exits the second group 4b; and $\phi_{2B}$ is a power of the second group 4b.

In this case, the angle u"$_A$ of the chief ray of the first wavelength $\lambda_A$ is given by the equation (9):

$$u''_A = u'_A + h_2 \phi_{2A} \tag{9}$$

Since the chief ray of the first wavelength $\lambda_A$ is parallel to the optical axis Ax, u'$_A$=0, and then the equation (9) is converted to $$u''_A = h_2 \phi_{2A} \tag{10}$$

On the other hand, the angle u"$_B$ of the second wavelength $\lambda_B$ is given by the equation (11):

$$u''_B = u'_B + h_2 \phi_{2B} \tag{11}$$

In order to coincide the rays of both of the wavelengths $\lambda_A$ and $\lambda_B$, it is required to satisfy u"$_A$=u"$_B$. Therefore, the required condition (12) is obtained based on the equation (10) and (11).

$$u'_B + h_2 \phi_{2B} = h_2 \phi_{2A} \tag{12}$$

This equation is converted to the equation (13) to solve about u'$_B$, $$u'_B = h_2 \varphi_{2A} - h_2 \varphi_{2B} \tag{13}$$
$$= h_2(\varphi_{2A} - \varphi_{2B})$$

Combining the equations (4), (13) and substituting $h_2=h_{1A}$ for the combined equation yields the equation (14).

$$h_2 \cdot (\varphi_{2A} - \varphi_{2B}) = \frac{\lambda_B}{\lambda_A} \cdot h_{1A} \cdot (\varphi_{1B} - \varphi_{1A}) \tag{14}$$

$$\varphi_{2A} - \varphi_{2B} = -\frac{\lambda_B}{\lambda_A} \cdot (\varphi_{1B} - \varphi_{1A})$$

Here, $$\varphi_{1A} - \varphi_{1B} = \frac{1}{f_{1A}} - \frac{1}{f_{1B}} = \frac{f_{1B} - f_{1A}}{f_{1A}} \cdot f_{1B}$$

and assuming that $f_{1B}-f_{1A}=\Delta f_1=-f_1/v_1$, and $f_{1A} \approx f_1 \approx f_{1B}$, $$\phi_{1A}-\phi_{1B} \approx f_1/f_1^2 \approx -1/(v_1 f_1) \tag{15}$$

Similarly, $$\phi_{2A}-\phi_{2B} \approx -1/(v_2 f_2) \tag{16}$$

Substitution of the equations (15) and (16) into the equation (14) yields the equation (17).

$$-\frac{1}{v_2 \cdot f_2} = \frac{\lambda_B}{\lambda_A} \cdot \frac{1}{v_1 \cdot f_1} \tag{17}$$

As the equation (17) is converted and is solved about $v_2$, $$v_2 = -\frac{\lambda_A}{\lambda_B} \cdot \frac{f_1}{f_2} \cdot v_1$$

and when the equation (7) is substituted therein, $$v_2 = -\frac{\lambda_A}{\lambda_B} \cdot \frac{f_1}{f_2} \cdot \frac{\lambda_B}{\lambda_B - \lambda_A} \cdot \frac{f_1 + f_2}{f_1} = -\frac{\lambda_A}{\lambda_B - \lambda_A} \cdot \frac{f_1 + f_2}{f_2} \tag{18}$$

The equation (18) can be converted to the equation (19) because $\lambda_B/(\lambda_B-\lambda_A)$ is equal to the equivalent Abbe number $v_{DOE}$ of a diffractive optical element.

$$v_2 = -\frac{f_1 + f_2}{f_2} \cdot v_{DOE} \tag{19}$$

The equation (19) is a condition of $v_2$ required to the second group 4b to direct the exiting directions of the beams of the wavelengths $\lambda_A$ and $\lambda_B$ that are incident on the second group 4b at different incident angles.

The above descriptions are directed to the chief rays of the wavelengths $\lambda_A$ and $\lambda_B$. In addition to the conditions (8) and (19), the compensating optical system 4 is required to coincide convergence or divergence of the beams of the wavelength $\lambda_A$ and $\lambda_B$ with each other in order to compensate the effect of the chromatic dispersion of the diffractive beam-dividing element 3 in the optical path that is the side of the object surface 10 than the compensating optical system 4. For this purpose, the beams of the wavelengths $\lambda_A$ and $\lambda_B$ should be parallel beams when they are reflected by the second group 4b.

As shown in FIG. 3, the beams of the wavelengths $\lambda_A$ and $\lambda_B$ are focused at the points where the distances from the first group 4a are equal to the focal lengths $f_{1A}$ and $f_{1B}$, respectively. And then, the beams are incident on the second group 4b as divergent beams. Therefore, a sum of focal lengths $f_{1A}$, $f_{2A}$ and a sum of focal lengths $f_{1B}$, $f_{2B}$ are required to be equal to a principal distance $f_1+f_2$ between the principal points of the first group 4a and the second group 4b in order to collimate the beams of the wavelengths $\lambda_A$ and $\lambda_B$. Further, the compensating optical system 4 should be afocal to both of the wavelengths $\lambda_A$ and $\lambda_B$. These conditions are expressed by the following equations (20).

$$f_{1A} + f_{2A} = f_{1B} + f_{2B} \tag{20}$$

$$f_{2B} - f_{2A} = f_{1A} - f_{1B}$$

$$\Delta f_2 = -\Delta f_1$$

$$-f_2/v_2 = f_1/v_1$$

A combination of values of $f_1$ and $f_2$ that satisfies the conditions (8), (19) and (20) is found by substituting the equations (8) and (19) into the equation (20) as follows:

$$f_1 = f_2 \tag{21}$$

Further, a combination of values of $v_1$ and $v_2$ that satisfies the conditions (8), (19) and (20) is found by substituting the equation (20) into the equations (8) and (19) as follows:

$$v_1 = -v_2 = 2v_{DOE} \tag{22}$$

Next, the relationship between angular magnifications $\beta_A$, $\beta_B$ of the compensating optical system 4 at the wavelengths $\lambda_A$, $\lambda_B$ and the wavelengths $\lambda_A$, $\lambda_B$ per se will be verified.

The focal length $f_{1B}$ of the first group 4a at the second wavelength $\lambda_B$ can be converted as follows from the equation (22).

$$f_{1B} = f_{1A} + \Delta f_1 \tag{23}$$

$$= f_{1A} - f_1/v_1$$

$$= f_{1A}(1 - 1/v_1)$$

$$= f_{1A} \cdot \left(1 - \frac{\lambda_B - \lambda_A}{2\lambda_B}\right)$$

$$= f_{1A} \cdot \left(\frac{\lambda_A + \lambda_B}{2\lambda_B}\right)$$

Similarly, the focal length $f_{2B}$ of the second group 4b at the second wavelength $\lambda_B$ can be converted as follows from the equation (22).

$$f_{2B} = f_{2A} + \Delta f_2 \tag{24}$$

$$= f_{2A} - f_2/v_2$$

$$= f_{2A}(1 - 1/v_2)$$

$$= f_{2A} \cdot \left(1 - \frac{\lambda_B - \lambda_A}{2\lambda_A}\right)$$

$$= f_{2A} \cdot \left(\frac{\lambda_A + \lambda_B}{2\lambda_A}\right)$$

Accordingly, the ratio $\beta_A/\beta_B$ between the angular magnifications $\beta_A$, $\beta_B$ of the compensating optical system 4 at the wavelengths $\lambda_A$, $\lambda_B$ can be obtained from the equations (23) and (24).

$$\frac{\beta_A}{\beta_B} = \frac{f_{1A}}{f_{2A}} \cdot \frac{f_{2B}}{f_{1B}} \tag{25}$$

$$= \frac{f_{1A} \cdot f_{2A} \cdot \frac{\lambda_A + \lambda_B}{2\lambda_A}}{f_{2A} \cdot f_{1A} \cdot \frac{\lambda_A + \lambda_B}{2\lambda_B}}$$

$$= \lambda_B/\lambda_A$$

The equation (25) shows that the angular magnification of the compensating optical system 4 satisfying the condition (22) is inversely proportional to the wavelength of the incident beam.

Next, a numerical example of the compensating optical system 4 that satisfies the conditions (21) and (22) will be described.

In the present example, the focal lengths $f_1$, $f_2$ and the Abbe numbers $v_1$, $v_2$ of the first and second groups 4a, 4b are fixed as follows:

The first group 4a: $f_1=120$, $v_1=2v_{DOE}$

The second group 4b: $f_2=120$, $v_2=-2v_{DOE}$

It should be noted that a resultant total focal length f of a composite optical element, which consists of a reflecting surface and a diffractive lens structure formed thereon, is defined as a resultant total value of the component $f_{ref}$ due to the power of a curved reflecting surface and the component $f_{dif}$ due to the power caused by the diffracting lens structure as expressed by the equation (26).

$$\frac{1}{f} = \frac{1}{f_{dif}} + \frac{1}{f_{ref}} \tag{26}$$

Further, a resultant total Abbe number v of such a composite optical element has the following relationship as shown in the equation (27) with the focal lengths f, $f_{ref}$, $f_{dif}$, the Abbe number of a reflecting mirror $v_{ref}$ ($=\infty$), and an equivalent Abbe number $v_{DOE}$.

$$\frac{1}{f \cdot v} = \frac{1}{f_{dif} \cdot v_{DOE}} + \frac{1}{f_{ref} \cdot v_{ref}} \tag{27}$$

$$= \frac{1}{f_{dif} \cdot v_{DOE}}$$

Substitution of $f=f_1=120$, $v=v_1=2v_{DOE}$ into the equation (27) yields the diffractive component $f_{1dif}$ of the focal length of the first group 4a.

$$f_{1dif}=240$$

In the same manner, substitution of $f=f_2=120$, $v=v_2=-2v_{DOE}$ into the equation (27) yields the diffractive component $f_{2dif}$ of the focal length of the second group 4b.

$$f_{2dif}=-240$$

On the other hand, substitution of $f_{dif}=f_{1dif}=240$, $f=f_1=120$ into the equation (26) yields the reflecting component $f_{1ref}$ of the focal length of the first group 4a.

$$f_{1ref}=240$$

In the same manner, substitution of $f_{dif}=f_{2dif}=-240$, $f=f_2=120$ into the equation (26) yields the reflecting component $f_{2ref}$ of the focal length of the second group 4b.

$$f_{2ref}=80$$

The following TABLE provides a summary of specification of the compensating optical system 4 of the numerical example.

TABLE

| | | |
|---|---|---|
| First group 4a | Resultant total Abbe number $v_1$ | 2 $v_{DOE}$ |
| | Resultant total focal length $f_1$ | 120 |
| | Reflecting component $f_{1ref}$ | 240 |
| | Diffractive component $f_{1dif}$ | 240 |
| Second group 4b | Resultant total Abbe number $v_2$ | $-2\ v_{DOE}$ |
| | Resultant total focal length $f_2$ | 120 |
| | Reflecting component $f_{2ref}$ | 80 |
| | Diffractive component $f_{2dif}$ | $-240$ |

With this setting, since the compensating optical system 4 satisfies the conditions (8), (19) and (20), the system 4 perfectly compensates an angular difference of the same order diffracted beams caused by the wavelength dependence of the diffractive beam-dividing element 3.

As described above, according to the present invention, an angular difference among the same order diffracted beams having different peak wavelengths caused by the wavelength dependence of a diffractive beam-dividing element can be compensated by the chromatic dispersion of the compensating optical system. Therefore, the same order diffracted beams diffracted at different angles can be directed in the same direction at the same position.

Accordingly, the defect such as a separation of the same order diffracted beam or a variation of the beam spot pitch due to difference of wavelength can be avoided while employing a diffractive beam-dividing element that is in no need of cementing and is able to divide the incident beam with high accuracy.

The present disclosure relates to the subject matter contained in Japanese Patent Application No. 2000-1192, filed on Jan. 7, 2000, which is expressly incorporated herein by reference in its entirety.

What is claimed is:

1. A multibeam optical system, comprising:
a laser source that emits a laser beam;
a diffractive beam-dividing element that diffracts the laser beam emitted from said laser source to divide the laser beam into a plurality of diffracted beams exiting at different diffraction angles, respectively; and
a compensating optical system, which is afocal, arranged such that the divided diffracted beams exiting from said diffractive beam-dividing element are incident on said compensating optical system;
said compensating optical system being configured such that an angular magnification of said compensating optical system is inversely proportional to a wavelength of light.

2. The multibeam optical system according to claim 1, said compensating optical system comprising a first group and a second group, both of said first and second groups being provided with diffractive lens structures, respectively.

3. The multibeam optical system according to claim 2, said first and second groups including reflecting surfaces having positive powers, respectively, said diffractive lens structure being formed on said reflecting surfaces, respectively.

4. The multibeam optical system according to claim 1, wherein said laser source comprises a multiline laser source that emits a laser beam having a plurality of peak wavelengths.

5. A multibeam optical system, comprising:
a multiline laser source that emits a laser beam having a plurality of peak wavelengths;
a diffractive beam-dividing element that diffracts the laser beam emitted from said laser source to divide the laser beam into a plurality of diffracted beams exiting at different diffraction angles, respectively; and
a compensating optical system that is afocal and is arranged such that the divided diffracted beams exiting from said diffracted beam-dividing element are incident on said compensating optical system, said compensating optical system comprising a first group and a second group;
wherein said compensating optical system further substantially satisfies the following relationships:

$$v_1 = \frac{f_1 + f_2}{f_1} \cdot v_{DOE} \tag{1}$$

$$v_2 = -\frac{f_1 + f_2}{f_2} \cdot v_{DOE} \tag{2}$$

$$\frac{f_1}{v_1} = -\frac{f_2}{v_2} \tag{3}$$

$$f_1 = f_2 \tag{4}$$

$$v_1 = -v_2 = 2v_{DOE}. \tag{5}$$

where $v_1$ is an Abbe number of said first group, $f_1$ is a focal length of said first group, $v_2$ is an Abbe number of said second group, $f_2$ is a focal length of said second group, and $v_{DOE}$ is a disperse power of said diffractive beam-dividing element, which corresponds to an Abbe number of a refractive lens.

6. A multibeam optical system, comprising:
a multiline laser source that emits a laser beam having a plurality of peak wavelengths;
a diffractive beam-dividing element that diffracts the laser beam emitted form said laser source to divide the laser beam into a plurality of diffracted beams exiting at different diffraction angles, respectively; and
a compensating optical system that is afocal and is arranged such that the divided diffracted beams exiting from said diffractive beam-dividing element are incident on said compensating optical system, said compensating optical system comprising a first group and a second group;
wherein said compensating optical system substantially satisfies the following relationships:

$$v_1 = \frac{f_1 + f_2}{f_1} \cdot v_{DOE}$$

$$v_2 = -\frac{f_1 + f_2}{f_2} \cdot v_{DOE}$$

where $v_1$ is an Abbe number of said first group, $f_1$ is a focal length of said first group, $v_2$ is an Abbe number of said second group, $f_2$ is a focal length of said second group, and $v_{DOE}$ is a dispersive power of said diffractive beam-dividing element, which corresponds to an Abbe number of a refractive lens; and
wherein both of said first and second groups are provided with diffractive lens structures, respectively.

7. The multibeam optical system according to claim 6, said first and second groups including reflecting surfaces having positive powers, respectively, said diffractive lens structures being formed on said reflecting surfaces, respectively.

8. A multibeam optical system, comprising:

a multiline laser source that emits a laser beam having a plurality of peak wavelengths;

a diffractive beam-dividing element that diffracts the laser beam emitted from said laser source to divide the laser beam into a plurality of diffractive beams exiting at different diffraction angles, respectively; and a compensating optical system that is afocal and is arranged such that the divided diffracted beams exiting from said diffractive beam-dividing element are incident on said compensating optical system, said compensating optical system comprising a first group and a second group;

wherein said compensating optical system substantially satisfies the following relationships:

$$v_1 = \frac{f_1 + f_2}{f_1} \cdot v_{DOE}$$

$$v_2 = -\frac{f_1 + f_2}{f_2} \cdot v_{DOE}$$

where $v_1$ is an Abbe number of said first group, $f_1$ is a focal length of said first group, $v_2$ is an Abbe number of said second group, $f_2$ is a focal length of said second group, and $v_{DOE}$ is a dispersive power of said diffractive beam-dividing element, which corresponds to an Abbe number of a refractive lens; and wherein a distance between said first group and said diffractive beam-dividing element is equal to the focal length $f_1$ of said first group.

* * * * *